Sept. 8, 1931.   E. F. ZAPARKA   1,822,186
CONTROLLING DEVICE FOR VEHICLE SPRING SUSPENSION SYSTEMS
Filed March 30, 1929
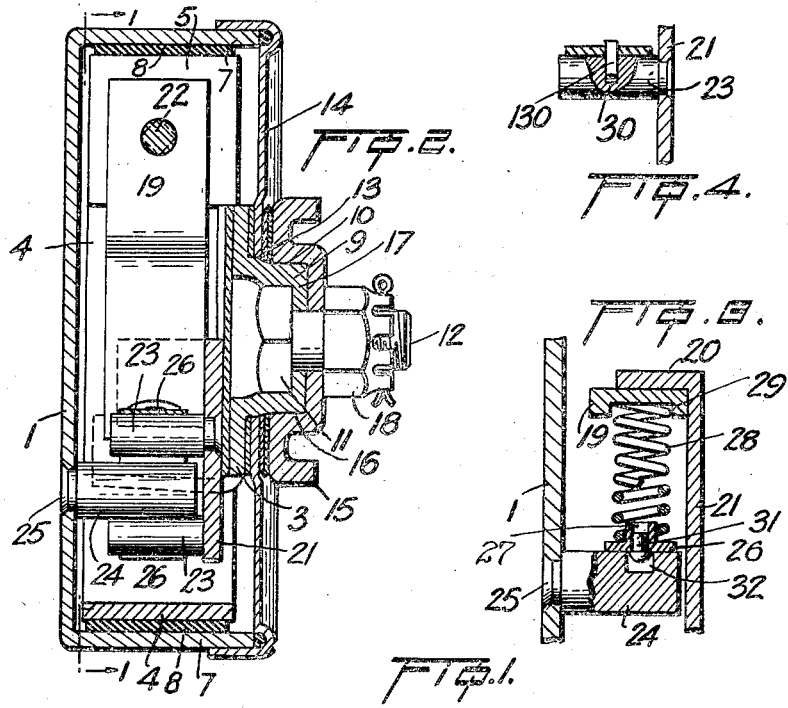
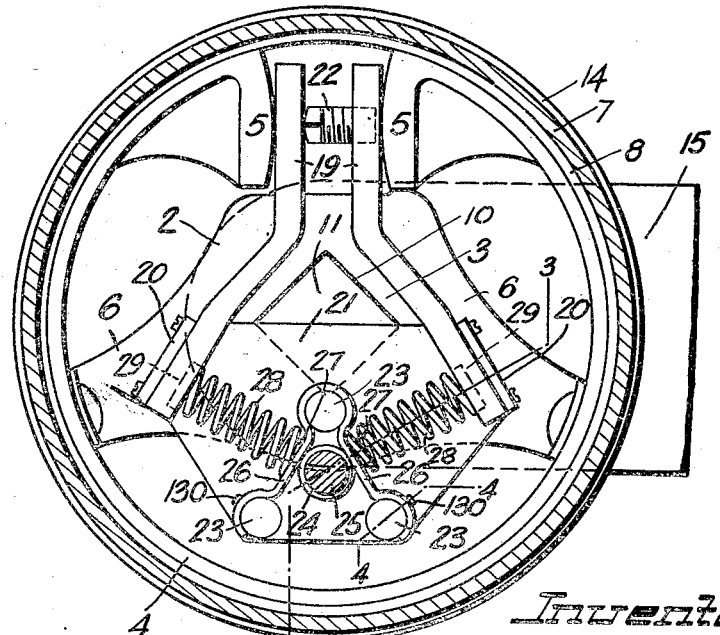
Inventor
E. F. Zaparka Patented Sept. 8, 1931

1,822,186

UNITED STATES PATENT OFFICE

EDWARD F. ZAPARKA, OF NEW YORK, N. Y., ASSIGNOR TO LEOPARD AUTOMOBILE PRODUCTS CORPORATION, OF NEW YORK, N. Y., A CORPORATION

CONTROLLING DEVICE FOR VEHICLE SPRING SUSPENSION SYSTEMS

Application filed March 30, 1929. Serial No. 351,323.

My invention relates to improvements in controlling devices for vehicle spring suspension systems, particularly of the friction type, and the object of the invention is to devise an improved means for actuating the applicator lever which functions to expand one friction element against another to offer frictional resistance to the movement of the vehicle axle away from its normal axial line with an accelerating rate of gain and to offer frictional resistance toward its normal axial line at an accelerating rate of loss.

With the above and other objects in view, which will hereinafter appear as the description proceeds, my invention consists of a device constructed and arranged, all as hereinafter more particularly described and illustrated in the accompanying drawings in which:

Fig. 1 represents a vertical section of my device through the line 1—1 Fig. 2.

Fig. 2 is a vertical cross section.

Fig. 3 is a detail in section through the line 3—3 Fig. 1, and

Fig. 4 is a detail in section through the line 4—4 Fig. 1.

Like characters of reference indicate corresponding parts in the different views.

The preferred embodiment of my invention comprises a drum 1 which is adapted to be secured to a side member of a vehicle chassis (not shown). A friction band assembly 2 is inserted into the drum and this may well comprise a central portion 3 and a split friction band 4 having spaced apart ends or abutments 5, the central portion 3 being connected to the band in any suitable way such as by the arms 6 which may or may not be formed integrally with the central portion 3 or band 4. Interposed between the annular wall 7 of the drum 1 and the friction band 4 is a brake or friction lining 8.

The central portion 3 of the band assembly 2 is provided with a hollow boss 9 with a rectangular interior 10 into which is inserted the squared head 11 of a forwardly protruding bolt 12. The hollow boss 9 extends forwardly and freely through a central orifice 13 in the cover 14 of the drum 1, and an actuating lever 15 having a squared socket portion 16 is secured to a correspondingly squared extremity 17 on the boss. The actuating lever 15 is adapted to be connected to the vehicle axle (not shown) by any suitable means. 18 is a nut threaded on the bolt 12 for securing the lever 15 in place.

An applicator lever has its free ends inserted between the abutments 5 of the split band 4 and such applicator lever preferably consists of two opposed spaced apart arms 19 connected to the upset ends 20 of a lever yoke 21 as is clearly illustrated in Fig. 1 of the drawings. A set screw 22 is provided threaded into one of the lever arms 19 and adapted to engage the other lever arm. It is to be understood that the arms are preferably constructed of spring metal and would tend to close together if the adjusting screw 22 were not interposed. Consequently, by adjusting the screw 22 the distance between the extremities of the arms 19 can be varied at will.

Three studs 23 are secured to the yoke 21 in spaced apart triangular relation, and normally located substantially at the center of such triangular stud formation is a stud 24 with a reduced portion 25, which is secured to the main portion of the drum 1, said stud protruding forwardly thereinto and adapted to engage the opposed plates 26 with curved ends adapted to engage the upper stud 23 and one of lower ones being connected to the latter by a loose connection which may comprise a pin 130 on the free end of each lower end of the plates extending freely into an orifice 30 in a lower stud 23. The plates 26 may be provided with centering elements or studs 27 to center the inner ends of the opposed springs 28. The centering studs 28 may be attached in any desired manner to the plates 26 being herein shown as integral with said plates. The outer ends of the springs 28 are preferably inserted into orifices 29 in the yoke connected ends of the arms 19 of the applicator lever. The centering elements 27 have pins 31 extending freely therethrough, the heads of which make a sliding fit in the orifice 32 in the stud 24 (see Fig. 3).

The operation of my device is substantially identical to the operation of the device referred to in my co-pending application.

Assuming that the actuating lever 15 moves the friction band assembly 2 in a counter-clockwise direction (Fig. 1) then the fulcrum point of the applicator lever which, in the absence of a provision of resilient means between the stud 24 and the lever would be on the axis of stud 24, is altered as the lever is moved upon movement of the band assembly and, consequently, is located intermediately between the axis of the band assembly and the axis of the stud 24. The left hand spring 28 is compressed whereas when the applicator lever is moved in the opposite direction the right hand spring 28 will be compressed. Thus the lever is angularly displaced upon movement of the band assembly in either direction away from its normal position and, consequently, the split ends of the band 5 are spread apart with the result that the band is increased in diameter applying increasing pressure upon the drum, depending upon the extent of movement of the band and applicator lever. Thus frictional resistance with an accelerating rate of gain is offered to the movement of the axle of the vehicle when it moves away from its normal axial line and such frictional resistance is let off with an accelerating rate of loss as such band assembly is moved in a direction corresponding with the movement of the axle of the vehicle back to its normal axial line.

Upon movement of the applicator lever in either direction, under influence of the band, it will be noted that the compression of either of the springs 28 is effected by stud 24 engaging one of the plates 26 and displacing it laterally so that the corresponding spring 28 is compressed. Lateral movement of plates 26 is permitted owing to the loose connection between their lower ends and the lower studs 23 constituted by the pins 130 freely inserted into the orifices 30 in the two lower studs 23.

What I claim as my invention is:

1. In a controlling device for vehicle spring suspension systems, in combination, two friction elements, one of which is movable relatively to the other, means for changing the diameter of one of the friction elements to exert pressure upon the other friction element as said element is moved away from its normal position, said means including an applicator lever operatively connecting one of the friction elements, an abutment on the other friction element, a lever yoke and opposed springs interposed between opposite ends of the lever yoke and the abutment.

2. In a controlling device for vehicle spring suspension systems, in combination, two friction elements, one of which is movable relatively to the other, means for changing the diameter of one of the friction elements to exert pressure upon the other friction element as said element is moved away from its normal position, said means including an applicator lever operatively engaging one of the friction elements, an abutment on the other friction element, a lever yoke, three spaced apart studs arranged in triangular formation on the yoke, opposed plates each engaging the upper and a lower stud and its lower end loosely connected to a lower stud, and opposed springs, each engaging a yoke end and one of the plates.

3. In a controlling device for vehicle spring suspension systems, in combination, two friction elements, one of which is movable relatively to the other, means for changing the diameter of one of the friction elements to exert pressure upon the other friction element as said element is moved away from its normal position, said means including an applicator lever operatively engaging one of the friction elements, a stud secured to one of the friction elements and offset from the axis of rotation of the movable element, a lever yoke, three spaced apart studs arranged in triangular formation on the yoke with the stud secured to one of the friction elements located normally at substantially the centre of the stud triangular formation, opposed plates each engaging an upper and a lower stud and its lower end loosely connected to a lower stud, said stud secured to one of the friction elements adapted to engage a plate upon the lever being swung, and opposed springs, each engaging a yoke end and one of the plates.

4. In a controlling device for vehicle spring suspension systems, in combination, a drum, a split expandible oscillatable friction band inserted into the drum, a double applicator lever having its free ends inserted between the ends of the split band, a lever yoke connecting the two portions of the lever together, a stud secured to the drum and offset from the axis of the expandible oscillatable friction element, three spaced apart studs arranged in triangular formation on the yoke, the stud secured to the drum located at substantially the center of said stud formation, opposed plates, each engaging an upper and a lower stud and its lower end loosely connected to a lower yoke stud, said drum stud adapted to engage the respective plates upon oscillation of the band, and opposed springs, each engaging a yoke end and a plate.

5. In a controlling device for vehicle spring suspension systems, in combination, two relatively movable friction elements, means for causing said friction elements to exert pressure on one another as one element is moved away from its normal position, said means including an applicator lever having spaced bearing parts and having operative connection with one of said friction elements, an abutment on the other friction element and opposed springs interposed respectively between said lever bearing parts and said abutment.

6. In a controlling device for vehicle spring suspension systems, in combination, two concentrically disposed relatively rotatable friction elements, means for changing the diameter of one of the friction elements so as to exert pressure upon the other element as said elements are relatively moved from normal position, said means including an applicator lever having spaced bearing parts and having operative connection with one of said friction elements, an abutment on the other friction element and opposed springs interposed respectively between said lever bearing parts and said abutment.

7. In a controlling device for vehicle spring suspension systems, in combination, two concentrically disposed relatively rotatable friction elements, means for changing the diameter of one of the friction elements so as to exert pressure upon the other element as said elements are relatively moved from normal position, said means including an applicator lever having spaced bearing parts and having operative connection with one of said friction elements, an abutment on the other friction element positioned within and eccentrically of said friction elements and opposed springs interposed respectively between said lever bearing parts and said abutment.

EDWARD F. ZAPARKA.